United States Patent [19]
Pera

[11] Patent Number: 4,664,134
[45] Date of Patent: May 12, 1987

[54] FUEL SYSTEM FOR FLIGHT VEHICLE

[75] Inventor: Ronald J. Pera, Seattle, Wash.

[73] Assignee: The Boeing Company, Seattle, Wash.

[21] Appl. No.: 782,218

[22] Filed: Sep. 30, 1985

[51] Int. Cl.[4] ............................................... F02C 7/22
[52] U.S. Cl. ........................................ 137/14; 55/159;
 60/39.48; 137/38; 137/177; 137/571; 244/135 B
[58] Field of Search ................... 137/38, 14, 550, 571,
 137/177; 55/159; 60/39.48, 259; 244/135 B

[56] References Cited
U.S. PATENT DOCUMENTS

| | | | |
|---|---|---|---|
| 2,621,719 | 12/1952 | Eaton | 244/135 B |
| 2,860,648 | 11/1958 | Harrison | 137/38 |
| 3,136,507 | 6/1964 | Erlanger et al. | 244/135 |
| 3,176,882 | 4/1965 | Meermans | 222/187 |
| 3,286,463 | 11/1966 | McGroarty | 60/39.48 |
| 3,409,714 | 11/1968 | Strugar, Jr. | 264/242 |
| 3,486,302 | 12/1969 | Paynter | 55/159 |
| 3,854,905 | 12/1974 | Balzer et al. | 55/159 |
| 3,933,448 | 1/1976 | Di Peri | 55/159 |
| 4,033,115 | 7/1977 | Baits | 60/39.48 X |
| 4,093,428 | 6/1978 | Swogger | 55/52 |
| 4,168,718 | 9/1979 | Hess et al. | 137/177 |

Primary Examiner—Robert G. Nilson
Attorney, Agent, or Firm—Joan H. Pauly

[57] ABSTRACT

A main storage tank (2) is pressurized by engine bleed air. A supply tank (12) communicates with tank (2) and with an engine feed line (50). A fluid impermeable expandable wall (34) separates tank (12) into isolator chamber (38) and pressure chamber (40). A surface tension screen (44) covers inlet (42) into isolator chamber (38) to allow liquid fuel to enter chamber (38) and prevent gas from entering chamber (38). During operation of the flight vehicle, a fuel pump withdraws fuel from chamber (38). Pressure chamber (40) is vented to ambient air when the flight vehicle is under no power or is operating under g forces greater than zero, to allow wall (34) to expand and contract to compensate for changes in temperature and pressure. Chamber (40) is pressurized by engine bleed air when the vehicle is operating under zero or negative g forces.

12 Claims, 3 Drawing Figures

FUEL SYSTEM FOR FLIGHT VEHICLE

DESCRIPTION

1. Technical Field

This invention relates to fuel systems for flight vehicles and, more particularly, to such a system which includes a surface tension screen and a flexible bladder, and which compensates for changes in temperature and pressure and for negative g flight conditions and isolates the fuel system from contamination by air and water vapor.

2. Background Art

Turbine engine powered single use flight vehicles, such as low altitude cruise missiles, must be stored for long periods of time with their fuel systems ready for use. Thus, there is a need for the fuel system to be able to compensate for fuel volume changes due to temperature changes during such long storage periods. When the flight vehicle is also carried on an aircraft, the fuel system will be subjected to changes in altitude as well as changes in temperature. Such changes in altitude must also be compensated for. In addition, when the vehicle is put into operation, it is likely to be subjected to negative g forces. In order to insure proper operation of the vehicle, the fuel system must also include means for adapting to negative g flight conditions. Thus, the fuel systems of such vehicles must be capable of compensating for three types of changes, temperature changes, altitude and pressure changes, and changes in g forces.

Various means have been used for dealing with each of these types of changes. For example, an external bladder which expands and contracts to accept volume change has been used to compensate for changes in temperature. A similar approach has been taken in devices designed to compensate for altitude changes. In many known systems, rather than providing for expansion and contraction to accept volume change, the fuel tank is simply made with thick walls that are highly pressure resistant. This approach has the disadvantages of adding considerable weight to the fuel system and of not permitting full use of the fuel since the system can only extract a percentage of the fuel from the tank. The known methods for making a fuel system adaptable to negative g conditions include attaching a floppy tube to the tank outlet and allowing it to follow the fuel inside the tank, and providing a trap tank which has a surface tension screen and into which fuel is fed from a main tank. Floppy tubes have the serious disadvantage of having a tendency to become stuck in a particular position. Known trap tank arrangements have no provision for expansion and contraction to compensate for changes in temperature and pressure.

Fuel systems have means for compensating for reduced or negative g conditions are disclosed in U.S. Pat. Nos. 2,860,468, granted Nov. 18, 1958, to J. W. Harrison; 3,286,463, granted Nov. 22, 1966, to J. D. McGroarty; 3,486,302, granted Dec. 30, 1969, to H. L. Paynter; 3,854,905, granted Dec. 17, 1974, to D. L. Balzer et al; 3,933,448, granted Jan. 20, 1976, to L. J. DiPeri; and 4,168,718, granted Sept. 25, 1979, with respect to an invention of D. A. Hess et al. U.S. Pat. No. 3,176,882, granted Apr. 6, 1965, to J. W. Meermans, discloses portable reservoirs for liquified gases designed to maintain supply of liquid regardless of the attitude or the state of motion of the reservoir.

Di Peri discloses a fuel tank having a collapsible membrane inside it. The membrane defines a substantially coextensive storage chamber having an outlet that is covered by a surface tension screen. When the tank is initally filled, the introduction of liquid forces gas out from the storage chamber. Pressurized gas is introduced into the tank between the tank walls and the membrane to collapse the membrane and force liquid out through the screen and the outlet. The purpose of the screen is to prevent gas produced by deterioration of the liquid from entering the outlet.

The fuel systems disclosed by Meermans, Balzer et al, and Hess et al include networks of surface tension channels for channeling liquid fuel to an outlet. McGroarty discloses a system in which pressurized gas is introduced into the main fuel containing portion of a tank to force liquid through a surface tension screen and out through an outlet. Paynter discloses a storage tank for a two-phase fluid. The tank has a foraminous member arranged therein to keep the liquid phase adjacent a liquid outlet and the vapor phase adjacent a vapor discharge outlet. Harrison discloses a collapsible antigravity liquid reservoir inside a main reservoir and a gravity check valve therebetween.

U.S. Pat. No. 3,136,507, granted June 9, 1964, to R. H. Erlanger et al, discloses a collapsible auxiliary fuel tank for an inflatable airplane. U.S. Pat. No. 3,409,714, granted Nov. 5, 1968, to M. Strugar, Jr., discloses a collapsible inner container for containing fumes in an automobile fuel tank. U.S. Pat. No. 4,093,428, granted June 6, 1978, to E. C. Swogger, discloses a device for separating liquid from gas in an aircraft hydraulic system by feeding gas containing liquid into a chamber and giving it a rotational velocity so that centrifugal force will separate the heavier gas-free liquid.

The above patents and the prior art that is discussed and/or cited therein should be studied for the purpose of putting the present invention into proper perspective relative to the prior art.

DISCLOSURE OF THE INVENTION

A subject of this invention is apparatus for compensating for temperature and pressure changes and negative g condition, and for isolating the fuel from contamination, in a flight vehicle fuel system of the type having a storage tank for storing fuel and means for pressurizing the tank. According to an aspect of the invention, the apparatus comprises a fuel supply tank having an inlet communicating with the storage tank and an outlet communicating with an engine feed line. A fluid impermeable movable wall separates the supply tank into a variable volume fuel isolator chamber and a variable volume pressure chamber. The inlet and the outlet communicate with the isolator chamber. A surface tension screen covers the inlet for allowing liquid fuel to enter the isolator chamber and preventing gas from entering the isolator chamber. Means is provided for venting and pressurizing the pressure chamber. Such means vents the pressure chamber to ambient air when the vehicle is under no power or is operating under positive g forces, to allow the movable wall to expand and contract to compensate for changes in temperature and pressure. The means pressurizes the pressure chamber when the vehicle is operating under negative g forces, to equalize the pressure on both sides of the movable wall so that such wall will contract as fuel is drawn out of the isolator chamber into the engine feed line.

According to a preferred aspect of the invention, the means for pressurizing the storage tank communicates the storage tank with a source of pressurized engine bleed air. The venting and pressurizing means includes valve means for selectively communicating the pressure chamber with ambient air or such source of engine bleed air. This arrangement has the advantages of being relatively simple in structure and operation and of helping to insure that the pressure on both sides of the movable wall is the same.

A feature of the invention is the provision of the supply tank with a base portion which defines an auxiliary chamber on the side of the screen opposite the isolator chamber. A conduit communicates the storage tank with the auxiliary chamber. The screen and auxiliary chamber are dimensioned to maximize the area of the screen through which fuel may enter the isolator chamber. The provision of the auxiliary chamber and the dimensioning of the screen and auxiliary chamber have the advantage of helping to insure that a suffificient supply of fuel enters the isolator chamber and is supplied to the engine during operation of the flight vehicle. Preferably, the auxiliary chamber is positioned above the screen and below the storage tank so that gas will readily return to the storage tank under positive g conditions.

Another subject of the invention is a method of compensating for temperature and pressure changes and negative g conditions, and of isolating the fuel from contamination, for use in a flight vehicle fuel system of the type having a storage tank for storing fuel and means for pressurizating the tank. According to an aspect of the invention, the method comprises providing a fuel supply tank and dividing the supply tank into a variable volume fuel isolator chamber and a variable volume pressure chamber separated by a fluid impermeable movable wall. The isolator chamber is communicated with the storage tank through an inlet in the isolator chamber. The isolator chamber is also communicated with an engine feed line through an outlet in the isolator chamber. The inlet is covered with a surface tension screen to allow liquid fuel to enter the isolator chamber and prevent gas from entering the isolator chamber. The pressure chamber is vented to ambient air when the vehicle is under no power or is operating under positive g forces, to allow the movable wall to expand and contract to compensate for changes in temperature and pressure. When the vehicle is operating under negative g forces, the pressure chamber is pressurized to equalize the pressure on both sides of the movable wall so that such wall will contract as fuel is drawn out of the isolator chamber into the engine feed line.

Preferably, the method further comprises filling the system in a reverse direction to ensure that no gas is left in the system. The filling procedure comprises opening a vent in the storage tank and collapsing the movable wall to force gas out of the isolator chamber through the screen and the opened vent in the storage tank. Fuel is fed into the isolator chamber through the engine feed line and the outlet in the isolator chamber, and into the storage tank from the isolator chamber through the screen and the inlet in the isolator chamber. The feeding of the fuel is continued until fuel exits the open vent. Then, the vent is closed, and an amount of fuel is removed from the isolator chamber through the feed line. The amount of fuel removed is sufficient to allow for expansion and contraction of the movable wall.

The method and apparatus of the invention provide an efficient and economical means for accomplishing the required compensation for temperature and pressure changes and changes in g forces discussed above. The structure of the apparatus of the invention is relatively simple, relatively easy and inexpensive to manufacture and maintain, and highly reliable in operation. The placing of the movable wall in a supply tank instead of the main storage tank allows the wall to be much smaller to thereby reduce its cost and greatly increase the reliability of its operation. The method of the invention is efficient and reliable, and both the method and apparatus are readily adaptable to design variations in the flight vehicles with which they are used.

In addition to compensating for temperature, pressure, and g force changes, the method and apparatus of the invention effectively isolate the fuel from the atmosphere and prevent the introduction of gases into the engine feed line that could interfere with the proper operation of the flight vehicle. The isolation of the fuel from the atmosphere prevents oxygen and water vaper in the atmosphere from contaminating the fuel. This in turn prevents both deterioration of the fuel caused by oxidation, and condensation of water vapor in the fuel.

The method and apparatus of the invention also increase the storage capabilities of the fuel system. The isolation of the system from contamination allows fuel to be stored in the system for long periods of time. In addition, the design of the system allows essentially complete extraction of the fuel in the system by the engine. This, in turn, increases the range of the flight vehicle.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

Figure 1:
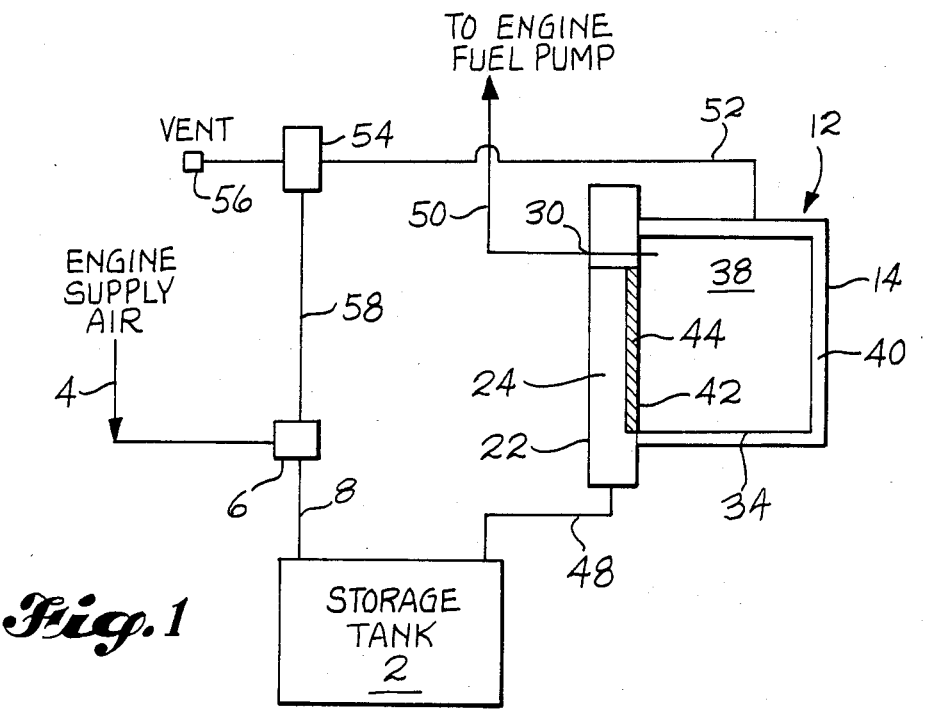
FIG. 1 is a schematic view of a flight vehicle fuel system into which a preferred embodiment of the invention has been incorporated.
Figure 3:
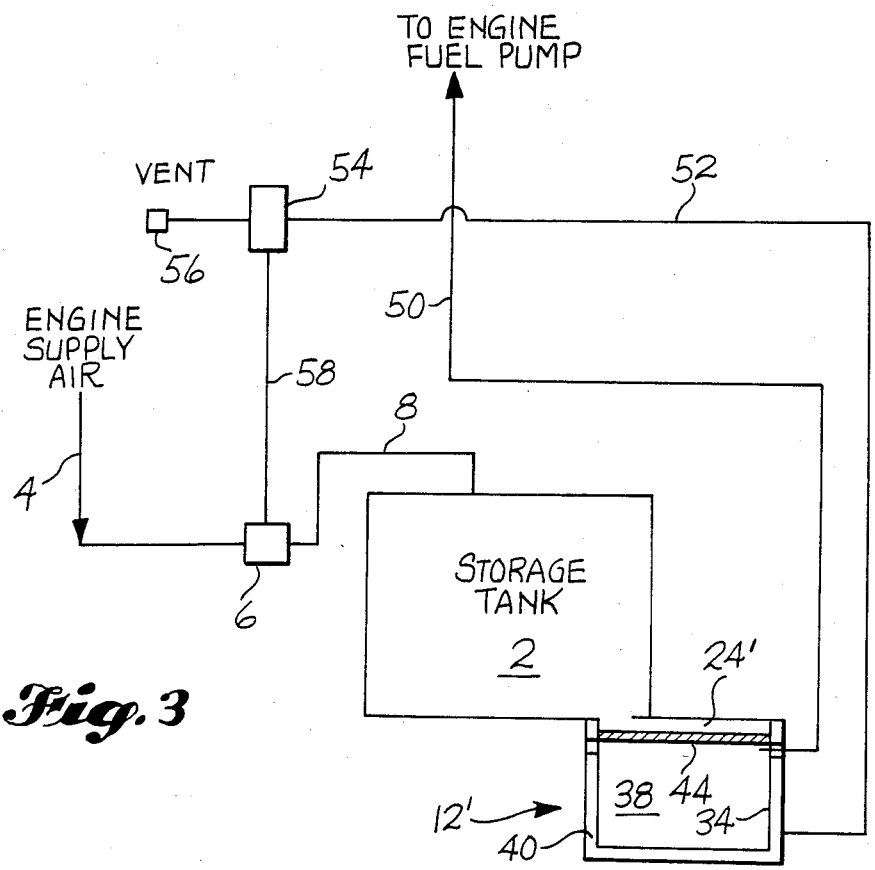
FIG. 3 is a schematic view of a flight vehicle fuel system into whcih a second preferred embodiment of the invention has been incorporated.

The drawings show apparatus that is constructed according to the invention and that also constitutes the best modes of the apparatus of the invention currently known to the applicant. The drawings also illustrate the best modes for carrying out the method of the invention currently known to the applicant. FIGS. 1 and 3 illustrate the use of the invention in connection with the fuel systems of flight vehicles having air breathing turbine engines. It is anticipated that the primary application of the invention will be in fuel systems of the type illustrated in FIGS. 1 and 3. However, it is of course to be understood that the method and apparatus of the invention may also be used to advantage in flight vehicle fuel systems having characteristics different from the characteristics of the systems shown in FIGS. 1 and 3.

Referring to FIG. 1, the illustrated system includes a main storage tank 2 in which the main body of the fuel is stored. The storage tank 2 would of course be much larger than the supply tank 12 in an actual system. The storage tank 2 is shown in FIG. 1 in a reduced size in order to facilitate illustration of the overall system and of the apparatus of the invention. In the system shown in FIG. 1, engine bleed air is supplied into the storage tank 2 in order to pressurize the tank 2 and the fuel exiting therefrom. A conduit 4 conveys pressurized air from the engine compressor to a regulator 6. A conduit 8 conveys the regulated pressurized air from regulator 6 into storage tank 2. This pressurizing arrangement for the storage tank 2 is conventional and forms no part of the present invention.

Figure 2:
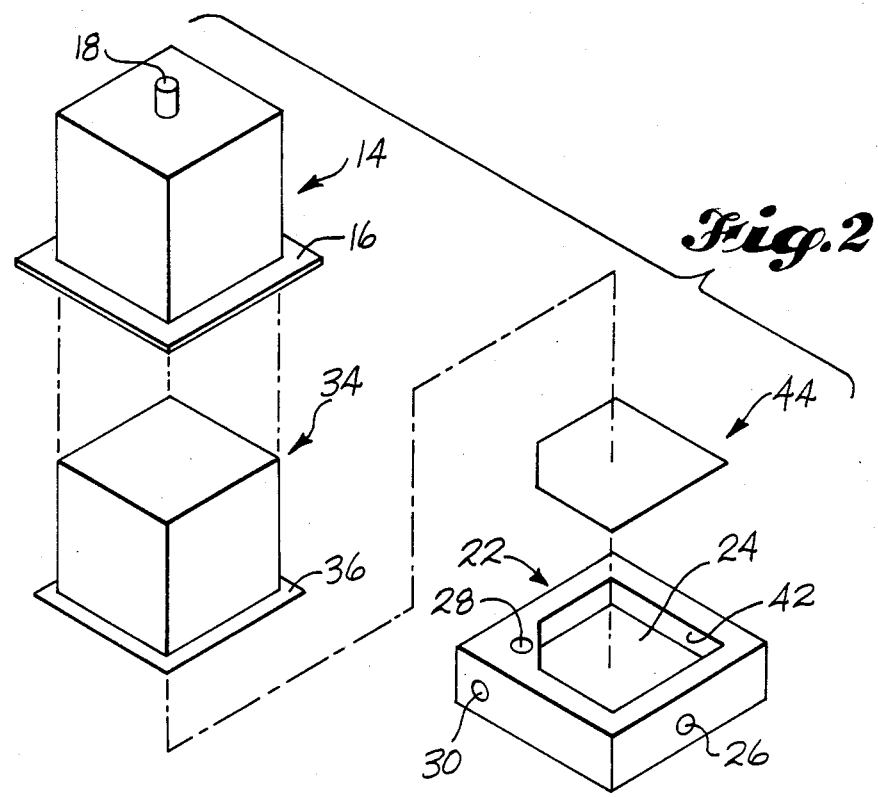
FIG. 2 is an exploded pictorial view of the supply tank, expandable wall, and screen of the preferred embodiment shown in FIG. 1.

The preferred embodiment of the apparatus of the invention shown in FIGS. 1 and 2 includes a supply tank 12 having a cover 14 and a base 22. The cover 14 has a mounting flange 16 for attaching the cover 14 to the base 22. The cover 14 also has a vent port 18 that functions as described below. An inlet 42 is defined between the cover 14 and base 22. The supply tank 12 is dimensioned to hold enough fuel to supply the engine throughout an episode of negative g condition, and to have sufficient room for expansion and contraction to accommodate temperature changes. For example, in a cruise missile the supply tank 12 would typically have a volume equal to about ten percent of the storage tank volume.

The walls of the cover 14 and the inlet 42 define the interior area of the main portion of the supply tank 12. This main portion is divided into a variable volume fuel isolator chamber 38 and a pressure chamber 40 by a fluid impermeable movable wall 34. The wall 34 has a shape similar to the shape of the cover 14 and includes an attaching flange 36 for attaching the wall 34 to the cover 14 and base 22. The pressure chamber 40 is defined between wall 34 and the walls of cover 14. The isolator chamber 38 is defined by the interior surface of the expandable wall 34, top surface portions of the base 22, and the inlet 42. When fully expanded, the wall 34 defines a space geometrically similar to but slightly smaller than the interior space in the main part of the supply tank 12.

An auxiliary chamber 24 is defined by the base 22 and has an inlet 26 that communicates with a conduit 48 which leads into the storage tank 2. The auxiliary chamber 24 is fully enclosed except for such inlet 26 and the inlet 42 leading from the auxiliary chamber 24 into the isolator chamber 38. The inlet 42 is covered by a surface tension screen 44 which permits liquid fuel from the storage tank 2 to enter the isolator chamber 38 via the auxiliary chamber 24 but prevents air or other gases from entering isolator chamber 38. The screen 44 preferably has a fairly large surface area, and the screen 44 and auxiliary chamber 24 are dimensioned to maximize the area of the screen 44 through which fuel may enter the isolator chamber 38. This arrangement helps insure that the screen 44 does not obstruct proper flow of fuel from storage tank 2 into isolator chamber 38 and from chamber 38 to the engine fuel pump during normal operation of the flight vehicle. The auxiliary chamber need not be very deep; for example, a three-quarter inch depth is generally sufficient.

Preferably, the screen 44 and auxiliary chamber 24 are positioned below the storage tank 2, and the auxiliary chamber 24 is positioned above the screen 44, so that air and other gases will readily return to the storage tank 2 from chamber 24 under positive g conditions. The provision of this preferred feature is facilitated by arranging the fuel system as shown in FIG. 3. The system shown in FIG. 3 is essentially the same as the system shown in FIGS. 1 and 2 except that the supply tank 12' is attached directly to the storage tank 2 and an opening in the lower wall of the storage tank 2 serves as the conduit between storage tank 2 and auxiliary chamber 24'.

Referring to FIGS. 1 and 2, the base 22 also includes an outlet passageway 28,30 spaced from the auxiliary chamber 24. The passageway 28,30 has one end 28 ported on the isolator chamber 38 and another opposite end 30 communicating with an engine feed line 50 which leads to the engine fuel pump.

The port 18 in the cover 14 communicates with the pressure chamber 40 defined between the inner wall surface of the cover 14 and the outer surface of the movable wall 34. When the vehicle is under no power or is operating under g forces greater than zero, the port 18 communicates with the ambient air to allow the movable wall 34 to expand and contract to compensate for changes in temperature and pressure. When the vehicle is operating under zero or negative g forces, port 18 communicates with the regulator 6 that supplies engine bleed air from the compressor via conduit 4. The communicating of port 18 with regulator 6 equalized the pressure on both sides of the movable wall 34 so that the wall 24 will contract as fuel is drawn out of the isolator chamber 38 into the engine feed line 50. The selective communication of port 18 with the ambient air or conduit 4 is accomplished by means of a conduit 52 that extends from port 18 to a valve 54. The valve 54 is operable to selectively communicate conduit 52 with either a vent 56 to the ambient air or a conduit 58 that connects valve 54 to regulator 6.

The parts of the apparatus of the invention may be constructed from a variety of materials. For example, the movable wall 34 may be an expandable flexible membrane made from an elastomeric material, an accordian-like structure made from metal, or even a piston that sealingly engages the sidewalls of cover 14. The surface tension screen 44 may be constructed from any suitable material that is permeable to the type of fuel being used in the system but impermeable to gas. An example of a suitable material for the screen 44 is the very fine weave material made from very thin stainless steel wire by the Puroflow Corporation of Santa Monica, Calif., and sold under the designation twilled double dutch weave. Material of this type typically includes 450 by 1750 strands per inch, with the resultant openings being in the order of 7 microns. The screen 44 is preferably flat to minimize costs, but it also may have a nonflat configuration. The valve 54 may be of various types. In the preferred embodiment, the valve 54 is a solenoid valve which is normally positioned to vent the pressure chamber 40 to ambient air.

In the embodiment shown in FIGS. 1 and 2, the cover 14, base 22, and expandable wall 34 have generally rectangular shapes. It is of course to be understood that the rectangular shapes shown in the drawings are only one example of the shapes that these elements may take. The shapes of the elements may of course be varied to suit the needs of a particular situation and/or manufacturing requirements without departing from the spirit and scope of the invention. For example, the cover 14 and expandable wall 34 might be provided in a cylindrical form.

The operation of the apparatus of the invention and the carrying out of the method of the invention is as follows.

First, the fuel is treated to remove essentially all air and water contamination. This is done to prevent oxidation and resulting deterioration of the fuel in the flight vehicle fuel system, and interruptions in the fuel feed during operation of the vehicle. When the fuel is ready, the flight vehicle fuel system is filled using a reverse method. The vent in storage tank 2 is opened, and the fuel is fed into the storage tank 2 through the engine feed line 50, the isolator chamber 38, and the screen 44. The reverse filling procedure is continued until fuel beings to come out of the vent in tank 2. This assures that no air is left in the system so that there will be no interruptions in the fuel feed when the flight vehicle is put into operations.

Before the system is filled, the supply tank 12 is turned upside down so that the expandable wall 34 is on top of the screen 44, and chamber 40 is pressurized to completely collapse wall 34 to force air out of chamber 38 through screen 44. Then, fuel is fed into the system through feed line 50. As the fuel is flowing into the system, the wall 34 is pumped (expanded and contracted) to ensure that no air is left in the system. This is continued until fuel begins to exit the vent in tank 2.

After the system, including the storage tank 2 and the isolator chamber 38, is completely full of fuel, the storage tank vent is closed to isolate the system, and then an amount of fuel is removed back out through the engine feed line 50. The removal of the fuel causes the expandable wall 34 to contract a corresponding amount. The amount of fuel removal and expandable wall contraction is gaged to provide sufficient room for the expandable wall 34 to expand and contract to compensate for changes in temperature and pressure during storage and captive carry of the flight vehicle. For example, a typical fuel designed for missiles expands and contracts ten percent in volume over a temperature range of minus 65° F. to plus 160° F. and, therefore, would require that a volume of fuel equal to ten percent of the fully expanded volume of chamber 38 be removed.

When the operation-ready flight vehicle is in storage or is being carried on an aircraft, the solenoid valve 54 is unpowered and the pressure chamber 40 is vented to ambient air. This allows the expandable wall 34 to expand and contract to compensate for changes in temperature and pressure due to variations in altitude and other environmental factors.

When the flight vehicle is put into operation and the engine is running, the valve 54 remains in position to vent the pressure chamber 40 as long as the g forces are positive. This permits the expandable wall 34 to expand. Fuel is extracted by the fuel pump from the pressurized storage tank 2 through conduit 48, auxiliary chamber 24, screen 44, isolator chamber 38, passageway 28,30, and conduit 50. This normal operation continues until the g forces on the flight vehicle reduce to zero or below.

Upon such reduction of the g forces, the valve 54 is operated by the vehicle electronics to switch the conduit 52 from communication with the vent 56 to communication with the conduit 58 leading to regulator 6. This causes the pressure chamber 40 to be pressurized with the same amount of pressure that is being supplied to the storage tank 2. Therefore, the pressure on both sides of expandable wall 34 is the same so that the wall 34 will contract as the fuel pump withdraws fuel from isolator chamber 38. The fuel exiting chamber 38 takes the path of least resistance through outlet passageway 28,30 into conduit 50 to the fuel pump. Although there is no fuel on the auxiliary chamber side of the screen 44, the screen 44 provides sufficient resistance to flow to prevent fuel from exiting chamber 38 through inlet 42. Screen 44 also continues to perform its major function of preventing air and other gases from entering isolator chamber 38 through inlet 42.

When the g forces on the vehicle increase to a level greater than zero, the valve 54 moves back to its position in which it vents pressure chamber 40. The venting of chamber 40, the pressurizing of storage tank 2, and the resumption of the supply of fuel to the auxiliary chamber side of the screen 44 causes fuel to enter isolator chamber 38 from auxiliary chamber 24 through screen 44 to expand the expandable wall 34 and fill the isolator chamber 38 for further use. When isolator chamber 38 refills, any air in conduit 48 and auxiliary chamber 24 bubbles out through conduit 48 back into storage tank 2. Conduit 48 is dimensioned to be large enough to permit this bubbling out of air. If any air should remain in the top of chamber 24 above the fuel and scren 44, the operation of the system is unaffected since the scren 44 is sized to allow air contact with part of the screen 44. The arrangement shown in FIG. 3 has the advantage of facilitating bubbling out of air from chamber 24'.

In order to ensure that the pressure chamber 40 is always pressurized under negative g conditions, the valve 54 is not operated at precisely zero g's. The valve 54 switches to pressurize chamber 40 when the g forces on the vehicle reduce to a level of about 0.01 g. The valve does not switch back to vent chamber 40 until the g forces increase to about 0.01 g.

It should be obvious to those skilled in the art to which this invention is addressed that the invention may be used to advantage in a variety of situations and that various modifications, changes, and omissions in form and detail may be amde without departing from the spirit and scope of the invention as defined by the folowing claims.

What is claimed is:

1. In a flight vehicle fuel system of the type having a storage tank for storing fuel and means for pressurizing the tank, apparatus for compensating for temperature and pressure changes and negative g conditions, and for isolating the fuel from contamination, said apparatus comprising:
  a fuel supply tank having an inlet communicating with the storage tank, and an outlet communicating with an engine feed line;
  a fluid impermeable movable wall separating the supply tank into a variable volume fuel isolator chamber and a varible volume pressure chamber, said inlet and said outlet communicating with the isolating chamber;
  a surface tension screen covering the inlet for allowing liquid fuel to enter the isolator chamber and preventing gas from entering the isolator chamber; and
  venting and pressurizing means for venting the pressure chamber to ambient air when the vehicle is under no power or is operating under positive g forces, to allow the movable wall to expand and contract to compensate for changes in temperature and pressure, and for pressurizing the pressure chamber when the vehicle is operating under negative g forces, to equalize the pressure on both sides of said wall so that said wall will contract as fuel is drawn out of the isolator chamber into the engine feed line.

2. Apparatus as described in claim 1, in which the means for pressurizing the storage tank communicates the storage tank with a source of pressurized engine bleed air, and the venting and pressurizing means includes valve means for selectively communicating the pressure chamber with ambient air or such source of engine bleed air.

3. Apparatus as described in claim 1, in which the supply tank includes a base portion defining an auxiliary chamber on the side of the screen opposite the isolator chamber; which further comprises a conduit communicating the storage tank with the auxiliary chamber; and in which the screen and auxiliary chamber are dimensioned to maximize the area of the screen through which fuel may enter the isolator chamber.

4. Apparatus as described in claim 3, in which the means for pressurizing the storage tank communicates the storage tank with a source of pressurized engine bleed air, and the venting and pressurizing means includes valve means for selectively communicating the pressure chamber with ambient air or such source of engine bleed air.

5. Apparatus as described in claim 1, in which the screen is positioned below the storage tank so that gas will readily return to the storage tank under positive g conditions.

6. Apparatus as described in claim 3, in which the auxiliary chamber is positioned above the screen and below the storage tank so that gas will readily return to the storage tank under positive g conditions.

7. For use in a flight vehicle fuel system of the type having a storage tank for storing fuel and means for pressurizing the tank, a method of compensating for temperature and pressure changes and negative g conditions and of isolating the fuel from contamination, said method comprising:
providing a fuel supply tank;
dividing the supply tank into a variable volume fuel isolator chamber and a variable volume pressure chamber separated by a fluid permeable movable wall;
communicating the isolator chamber with the storage tank through an inlet in the isolator chamber with an engine feed line through an outlet in the isolator chamber; and
covering the inlet with a surface tension screen to allow liquid fuel to enter the isolator chamber and prevent gas from entering the isolator chamber;
venting the pressure chamber to ambient air when the vehicle is under no power or is operating under positive g forces, to allow the movable wall to expand and contract to compensate for changes in temperature and pressure; and
pressurizing the pressure chamber when the vehicle is operating under negative g forces, to equalize the pressure on both sides of said wall so that said wall will contract as fuel is drawn out of the isolator chamber into the engine feed line.

8. A method as described in claim 7, in which the storage tank is pressurized by communicating it with a source of pressurized engine bleed air, and the step of pressurizing the pressure chamber in the supply tank comprises operating a valve to communicate the pressure chamber with such source of engine bleed air.

9. A method as described in claim 7, further comprising filling the system in a reverse direction to ensure that no gas is left in the system; said filling including opening a vent in the storage tank, collapsing the movable wall to force gas out of the isolator chamber through the screen and the opened vent in the storage tank, feeding fuel into the isolator chamber through the engine feed line and said outlet and into the storage tank from the isolator chamber through the screen and said inlet, continuing to so feed fuel until fuel exits the opened vent, closing the vent, and removing an amount of fuel from the isolator chamber through said feed line sufficient to allow for expansion and contraction of said wall.

10. A method as described in claim 7, comprising positioning the screen below the storage tank to facilitate return of gas to the storge tank under positive g conditions.

11. A method as described in claim 7, in which the step of communicating the isolator chamber with the storage tank comprises providing an auxiliary chamber on the side of the screen opposite the isolator chamber, communicating the auxiliary chamber with the storage tank, and dimensioning the screen and the auxiliary chamber to maximize the area of the screen through which fuel may enter the isolator chamber.

12. A method as described in claim 11, comprising positioning the auxiliary chamber above the screen and below the storage tank to facilitate return of gas to the stoage tank under positive g conditions.

* * * * *

UNITED STATES PATENT AND TRADEMARK OFFICE
CERTIFICATE OF CORRECTION

PATENT NO. : 4,664,134

DATED : May 12, 1987

INVENTOR(S) : Ronald J. Pera

It is certified that error appears in the above-identified patent and that said Letters Patent are hereby corrected as shown below:

Column 1, line 12, "vaport" should be -- vapor --.

Column 1, line 56, "2,860,468" should be -- 2,860,648 --.

Column 2, line 43, "condition" should be -- conditions --.

Column 3, lines 18 and 19, "suffificient" should be -- sufficient --.

Column 3, line 30, "pressurizating" should be -- pressurizing --.

Column 6, line 23, "equalized" should be -- equalizes --.

Column 6, line 25, "wall 24" should be -- wall 34 --.

Column 6, line 47, "1750" should be -- 2750 --.

Column 7, line 14, "operations" should be -- operation --.

Column 8, line 21, "scren" should be -- screen --.

UNITED STATES PATENT AND TRADEMARK OFFICE
CERTIFICATE OF CORRECTION

PATENT NO. : 4,664,134

DATED : May 12, 1987

INVENTOR(S) : Ronald J. Pera

Page 2 of 2

It is certified that error appears in the above-identified patent and that said Letters Patent are hereby corrected as shown below:

Column 8, line 22, "scren" should be -- screen --.

Column 8, line 37, "amde" should be -- made --.

Claim 7, column 9, 6th line from bottom, "permeable" should be -- impermeable --.

Claim 7, column 9, 3rd line from bottom, after "isolator chamber", add -- , and communicating the isolator chamber --.

Claim 10, column 10, 3rd line of claim, "storge" should be -- storage --.

Signed and Sealed this

Nineteenth Day of January, 1988

Attest:

DONALD J. QUIGG

Attesting Officer

Commissioner of Patents and Trademarks